United States Patent [19]

Hoshino et al.

[11] Patent Number: 5,216,044

[45] Date of Patent: * Jun. 1, 1993

[54] SYNTHETIC CORE-SHELL PARTICLE RESIN EMULSION, PROCESS FOR PRODUCING AND COATING COMPOSITIONS COMPRISING SAME

[75] Inventors: Futoshi Hoshino, Tokyo; Makoto Nakano, Chigasaki; Kousuke Someya; Junko Morita, both of Yokohama; Takeshi Yanagihara, Chigasaki, all of Japan

[73] Assignee: Mitsui Toatsu Chemicals, Incorporated, Tokyo, Japan

[ * ] Notice: The portion of the term of this patent subsequent to Aug. 20, 2008 has been disclaimed.

[21] Appl. No.: 604,491

[22] Filed: Oct. 26, 1990

[30] Foreign Application Priority Data

Oct. 27, 1989 [JP] Japan .................................. 1-278622

[51] Int. Cl.$^5$ ................................................ C08F 6/14
[52] U.S. Cl. .................................... 523/201; 525/301; 525/308; 525/330.6; 525/902
[58] Field of Search ................ 523/201; 525/301, 308, 525/330.6, 902

[56] References Cited

U.S. PATENT DOCUMENTS

| | | | |
|---|---|---|---|
| 4,427,836 | 1/1984 | Kowalski et al. | 525/201 |
| 4,469,825 | 9/1984 | Kowalski et al. | 523/201 |
| 4,594,363 | 6/1986 | Blankenship | 521/64 |
| 4,876,313 | 10/1989 | Lorah | 525/281 |
| 5,041,464 | 8/1991 | Hoshino et al. | 521/65 |

FOREIGN PATENT DOCUMENTS 267726A 5/1988 European Pat. Off. .
0338486 10/1989 European Pat. Off. .
376684A 7/1990 European Pat. Off. .

OTHER PUBLICATIONS

Abstract of JP 61-62510.
Abstract of JP 59-59741.
Chemical Abstracts, vol. 101, No. 10, Sep. 1984.
Database WPIL No. 89-253384.

Primary Examiner—Paul R. Michl
Assistant Examiner—John J. Guarriello
Attorney, Agent, or Firm—Millen, White, Zelano & Branigan

[57] ABSTRACT

A synthetic resin emulsion whose polymer particles are solid core-shell particles in which form pores spontaneously upon drying is produced by the steps of preparing as core particles from 2 to 60 parts by weight of polymer (A) by emulsion polymerization of from 10 to 80 parts by weight of acrylate ester ($a_1$) having an alkyl group of from 1 to 3 carbon atoms and from 90 to 20 parts by weight another of vinyl-type monomer ($a_2$) copolymerizable therewith, forming a shell of a polymer (B) on the surface of the core particles of polymer (A) by emulsion polymerization in the presence thereof of from 98 to 40 parts by weight of vinyl-type monomer (b), different from polymer ($a_1$) and successively hydrolyzing the core portion of the particles with an alkaline material. Organic pigments prepared from the synthetic resin emulsion can improve the hiding power, brightness, gloss and other properties of articles coated therewith.

16 Claims, No Drawings

5,216,044

SYNTHETIC CORE-SHELL PARTICLE RESIN EMULSION, PROCESS FOR PRODUCING AND COATING COMPOSITIONS COMPRISING SAME

BACKGROUND OF THE INVENTION a) Field of the Invention

The present invention relates to a novel core-shell synthetic resin emulsion, to coating compositions for paints paper coating and information recording papers, and based thereon, and to a process for its production.

b) Description of the Related Art

In recent years, various kinds of high molecular weight polymer particles have been studied for use as additives, such as pigments and fillers, for coating compositions.

The most commonly used polymer particularized are homogeneous and solid, emulsion-polymerized polystyrene particles having a diameter of 0.2 to 0.5$\mu$. For example, Japanese Patent Laid-Open No. 59741/'84 discloses a process wherein an unsaturated carboxylic acid and a vinyl monomer are copolymerized in the presence of an anionic surface active agent and/or a nonionic surface active agent to form a copolymer emulsion in which more than 90% of the particles have a diameter of 0.20 to 0.28$\mu$. It is also described therein that the copolymer emulsion can be used as an organic pigment in applications such as paper coating and paints. However, the thus-produced organic pigment fails to provide sufficient hiding power, brightness and gloss and no practical advantage is obtained unless it is used in a large amount.

In order to improve hiding power, brightness and gloss of coating composition based on emulsion polymerized polymer particles, the use of particles having pores, unlike the above homogeneous and solid particle, has recently been proposed in U.S. Pat. No. 4427836. That patent discloses a process for producing an aqueous dispersion which comprises providing a dispersion of core particles formed from a polymer containing at least 5% of a carboxylic acid monomer, adding thereto at least one monoethylenically unsaturated sheath monomer for forming a sheath polymer on the core particles subjecting this monomer to emulsion polymerization, and neutralizing the resulting emulsion with an aqueous volatile base to swell the core particles and thereby form minute openings therein.

When the polymer particles produced by the above patented process are used as an organic pigment in paints or paper coating compositions, an improvement in hiding power and brightness is achieved as compared with the use of organic pigments based on homogeneous solid polymer particles. However, in order to obtain sufficient minute openings in the particles to improve hiding power and brightness by the process, a large amount of unsaturated carboxylic acid must be employed to produce the core particles. As a result, the hydrophilic property of the core particles is enhanced and it becomes difficult to uniformly coat the core particles with the sheath polymer, which leads to the formation of secondary particles which have poor properties. Further, in view of the mechanism that generates the minute openings with neutralization-swelling of the core particles containing carboxyl groups, it is also difficult to control the size of the minute openings for specific end-use applications.

Japanese Patent Laid-Open No. 62510/'86 discloses a process for the production of a synthetic resin emulsion which forms emulsion particles with pores in the interior thereof by utilizing the phenomena of phase separation between different kinds of polymer particles in the polymerization reaction and of volumetric shrinkage resulting from the polymerization. However, an organic pigment based on the polymer particles does not have improved properties, e.g., increased gloss, hiding power and brightness because the pores formed in the particles are too minor.

OBJECT AND SUMMARY OF THE INVENTION

It is a first object of the present invention to provide a novel synthetic resin emulsion the polymer particles of which are solid but which become porous when the particles are dried, when emulsion is useful as an additive to coating compositions for paints, paper coating and information recording papers.

It is another object to provide a process for producing same.

It is another object of the present invention to provide coating compositions comprising a synthetic resin emulsion of this invention which have excellent physical properties, such as hiding power, brightness and gloss.

It is a further object to provide a process for the production of the synthetic resin composition of this invention.

The above objects of the present invention are accomplished by providing a synthetic resin emulsion whose polymer particles are core-shell type having a diameter of from 0.1 to 5.0$\mu$ which are solid and wherein spontaneously become porous in a dry state and by providing a process for producing the synthetic resin emulsion which comprises the step of preparing as core particles from 2 to 60 parts by weight of a hydrolyzable polymer (A), e.g., by emulsion polymerization of from 10 to 80 parts of weight of an acrylate ester ($a_1$) having an alkyl group of from 1 to 3 carbon atoms and from 90 to 20 parts by weight of another monomer, e.g., vinyl-type monomer, ($a_2$) copolymerizable therewith, forming a shell of polymer (B) which is more resistant to hydrolysis than polymer (A) as an external layer on the surface of the core particles of the polymer (A), e.g., by emulsion polymerization of from 98 to 40 parts by weight of one or more vinyl-type monomers (b) in the presence of the core particles, and then successively hydrolyzing the core portion of the resultant core-shell structure of the thus-produced particles, e.g., with an alkaline material.

This invention is based on the discovery that upon drying pores will form spontaneously in solid core-shell polymer particles of an emulsion polymerizate, if the polymer forming the sheath is a hydrophobic polymer and the polymer forming the core is a water swollen, hydrophilic polymer.

The fine polymer particles contained in the synthetic resin emulsion of the present invention spontaneously form pores in the interior thereof when the particles are dried. Such emulsion particles have excellent hiding power, brightness and gloss due to morphological characteristics when used as a pigment or a filler, for example, in paints and paper coatings. The particles can replace a portion or all of the titanium dioxide, kaolin clay and calcium carbonate conventionally used in these end usages.

Further, the emulsion particles save weight and improve hardness, abrasion resistance and thermal resistance of coatings formed from coating compositions comprising the particles of this invention. Hence the particle can also be used for an additive to various compositions, paper, metals, plastics, fibers and cloth.

DETAILED DESCRIPTION OF THE INVENTION

The easily hydrolyzable vinyl-type monomers suitable as monomer ($a_1$) are those having a readily hydrolyzable functional group viz., preferably an ester group, e.g., methyl acrylate, ethyl acrylate and propyl acrylate.

Exemplary of vinyl-type monomers ($a_2$) different from the ($a_1$) monomer which are used along with an alkyl ($C_{1-3}$) acrylate ($a_1$) monomer for preparing the core particles of polymer (A) are monomers with a functional group which in polymer (A) is less readily hydrolyzed than the ester group provided by $a_1$, e.g., acrylate esters having an alkyl group of at least 4 carbon atoms such as butyl acrylate; methacrylate esters such as methyl methacrylate, ethyl methacrylate and butyl methacrylate; vinyl monomer which lack a hydrolyzable functional group, e.g., aromatic vinyl compounds, such as styrene, α-methylstyrene, and vinyltoluene; vinyl cyano compounds, such as (meth)acrylonitrile; and halogenated vinyl compounds, such as vinyl chloride and vinylidene chloride.

The stability of the emulsion can be improved by including in the mixture of monomers used to form polymer (A) an unsaturated carboxylic acid, such as (meth)acrylic acid, crotonic acid and itaconic acid; an unsaturated sulfonic acid, such as sodium styrenesulfonate; (meth)acrylate esters such as 2-hydroxyethyl (meth)acrylate and glycidyl (meth)acrylate; or an unsaturated amide, such as (meth)acrylamide and N-methylol(meth)acrylamide.

In order to improve the permeability of the material used to hydrolyze polymer (A) into the whole of the core particle and to accelerate the hydrolysis thereof described below, use of an unsaturated carboxylic acid is preferred. The amount of unsaturated carboxylic acid contained in the 90 to 20 parts by weight of copolymerizable vinyl monomer ($a_2$) is generally in the range of 0.5 to 10 parts by weight, preferably 1 to 8 parts by weight, more preferably 2 to 5 parts by weight, most preferably 2 to 4 parts by weight per 100 parts by weight of the sum of acrylate ester ($a_1$) and vinyl monomer ($a_2$).

The use of less than 0.5 parts by weight the unsaturated carboxylic acid is not practical because an excessively long time is required for the hydrolysis of the polymer (A) forming the core of the particles. On the other hand, when the amount thereof exceeds 10 parts by weight, it becomes difficult to form the external layer of polymer (B) on the surface of the core particles of polymer (A).

A crosslinking monomer can also be used, to form polymer (A). Crosslinking monomers which can copolymerize with the above monomer mixtures comprising monomer ($a_1$) include, for example, divinylbenzene, ethylene glycol di(meth)acrylate, trimethylolpropane trimethacrylate and other monomers having at least two polymerizable unsaturated linkages in a molecule. The amount of the crosslinking monomer used is preferably 2% by weight or less, more preferably 1% by weight or less of the monomers ($a_1$) and ($a_2$).

Use of the crosslinking monomer increases the molecular weight of core polymer (A), inhibits diffusion of polymer (B) from the external layer to the interior of the core particle, and hence polymer (B) is favorably formed only on the outside of the core particle.

However, an amount of the crosslinking monomer exceeding 2% by weight inhibits swelling which occurs by the presence of water in the core portion as a result of hydrolysis of core polymer (A).

Because it is the portion of the polymer (A) molecule polymeric provided by polymer ($a_1$) which is susceptible to hydrolysis in the hydrolysis treatment by the alkaline material, the portion of monomer ($a_1$) in the mixture of monomers employed to prepare polymer (A) is from 10 to 80 parts by weight, preferably from 15 to 65 parts by weight, more preferably from 25 to 50 parts by weight per 100 parts by weight of the sum of monomers ($a_1$) and ($a_2$).

When the amount of acrylate ester ($a_1$) having the alkyl group of 1 to 3 carbon atoms is less than 10 parts by weight of all of the monomers used to produce polymer (A), swelling of the core portion of the core-shell particles due to hydrolysis is insufficient and effective pores are not formed in the interior of the particle in a dry state. On the other hand, an amount exceeding 80 parts by weight makes difficult the formation of a sheath of polymer (B) on the outside of the core particles of polymer (A).

One or more of the acrylate esters ($a_1$) may be used. However, ($a_1$) preferably consists of or comprises methyl acrylate because it has the highest hydrolyzability.

Examples of vinyl-type monomers (b) which lack a hydrolyzable functional group and which can be employed to form the external polymer layer on the core particles of polymer (A) are aromatic vinyl compounds, such as styrene, α-methylstyrene and vinyltoluene; vinyl cyano compounds, such as (meth)acrylonitrile; and halogenated vinyl compounds such as vinyl chloride and vinylidene chloride. Examples of monomers with functional groups which are less readily hydrolyzable than the groups on monomer ($a_1$) are (meth)acrylate esters, such as methyl (meth)acrylate, ethyl (meth)acrylate and butyl (meth)acrylate.

Examples of monomers (b) which posses a functional group and which can be used for copolymerization with the above monomer to provide stability for the emulsion includes unsaturated carboxylic acids, such as (meth)acrylic acid, crotonic acid and itaconic acid; unsaturated sulfonic acid salts, such as sodium styrenesulfonate; unsaturated bases, such as dimethylaminoethyl methacrylate; (meth)acrylate esters, such as 2-hydroxyethyl (meth)acrylate and glycidyl (meth)acrylate; and amides, such as (meth)acrylamide and N-methylol(meth)acrylamide.

In order to accelerate permeation of the alkaline material into the core particle in hydrolysis treatment, an unsaturated carboxylic acid is included as a monomer portion of monomer (b), preferably in an amount of 10% by weight or less. An amount of unsaturated carboxylic acid exceeding 10% by weight is not unpractical because secondary polymer particles are liable to be produced, water resistance of coatings formed from the resulting resin emulsion is decreased, and viscosity increase is accelerated in the hydrolysis treatment.

If desired monomer (b) can include a crosslinking monomer which will copolymerize with the vinyl monomer, for example, divinylbeznene, ethylene glycol di(meth)acrylate, trimethylolpropane trimethacrylate and other monomers having at least two polymerizable, unsaturated linkages in a molecule. The amount of the crosslinking monomer is preferably 3% by weight or less, more preferably 2% by weight or less of the vinyl monomer (b).

A crosslinking monomer can the properties of coatings formed from the resin emulsion, e.g., improve resistance to blocking, heat and solvent. However, as amount thereof exceeding 3% by weight inhibits the water swelling which occurs in the core portion as a result of the hydrolysis of the core polymer (A).

The combination of monomers (b) can be freely selected. However, combinations which imparts a gloss transition temperature to the resultant polymer (B) of preferably 50° C. and more preferably 70° C. and more are preferred.

Preparation of the above emulsion particle having core-shell structure is usually carried out by emulsion polymerization.

The surface active agent for use in the emulsion polymerization may be any type which is commonly used for an emulsion polymerization process. Exemplary surface active agents include anionic surface active agents, such as sodium alkylbenzenesulfonate, sodium alkylsulfate, sodium dialkylsulfosuccinate and naphthalenesulfonic acid/formaldehyde condensate; and nonionic surface active agents, such as polyoxyethylene alkyl ether, polyoxyethylene alkylphenol ether, ethylene oxide/propylene oxide block copolymer and sorbitan fatty acid ester. The surface active agent is used singly or in combination.

No particular limitation is imposed upon the amount of the surface active agent. The amount is usually from 0.1 to 10% of the total weight of the monomers.

Any kind of polymerization initiator which is commonly used in emulsion polymerization processes can be used for the present invention. Representative polymerization initiators include persulfates, such as potassium persulfate, sodium persulfate and ammonium persulfate; organic peroxides, such as benzoyl hydroperoxide; and azo compounds, such as azobisisobutyronitrile. The polymerization initiator can also be used if desired, in the form of a redox type initiator, in combination with a reducing agent.

In the preparation of a core particle emulsion of polymer (A), polymerization is carried out by adding the various monomers at one time, in portions or continuously as a stream of droplets in the presence of the above mentioned surface active agent, polymerization initiator and buffer. The polymerization is carried out at a temperature of 20° to 90° C. in an atmosphere of nitrogen.

To 2 to 60 parts by weight of the polymer (A) core particles thus obtained, 98 to 40 parts by weight of the vinyl monomer or monomers (b) optionally containing the crosslinking monomer are successively added at one time, in portions or continuously to carry out emulsion polymerization thereof.

The amount of polymer (B) produced is generally from 98 to 40 parts by weight, preferably from 95 to 50 parts by weight, more preferably from 95 to 65 parts by weight per 100 parts by weight of the sum of polymer (A) and polymer (B).

If the amount of polymer (B) exceeds 98 parts by weight of the sum of polymer (A) and polymer (B), hydrolysis of core portion becomes difficult and even if hydrolysis occures, effective pores do not generate in the interior of the core portion when the resin particles are dried.

When the amount of polymer (B) is less than 30 parts by weight of the sum of polymer (A) and polymer (B), the external layer of polymer (B) cannot completely cover the core portion of the particles. Consequently, the particle deforms upon treatment with the alkaline material and pores cannot be formed in the particles.

The core portion in the particle of synthetic resin emulsion thus obtained is hydrolyzed, e.g., treatment with an alkaline material, to give the synthetic resin emulsion of this invention which generates pores in the interior of the particle in a dry state.

Alkaline materials suitable for use as the hydrolyzing agent in the hydrolysis step include inorganic bases, such as potassium hydroxide and sodium hydroxide; volatile bases, such as ammonia; and organic bases, such as dimethylethanolamine and triethylamine.

In order to accelerate hydrolysis of the core particle polymer (A) in the hydrolysis treatment, it is also effective to add compounds having alcoholic hydroxyl groups, for example, methyl alcohol and ethyl alcohol.

The range of pH in an alkaline hydrolysis treatment is from 8 to 13, preferably from 9 to 12.0. When the pH is less than 8 in the treatment, hydrolysis becomes difficult and the particles which generate pores cannot be obtained. Thus, acid hydrolysis is not ordinarily employed, unless the functional groups present in polymer (A) is susceptible to acid hydrolysis. On the other hand, a pH of higher than 13 severely impairs stability of emulsion during the treatment and the treatment itself cannot be smoothly conducted.

The hydrolysis temperature is from 50° to 100° C., preferably from 70° to 98° C., more preferably from 80° to 95° C. When the temperature is lower than 50° C., plasticization of the external layer is insufficient and hence hydrolysis and accompanied swelling by water do not occur in the core portion and the desired pore generating particles cannot be obtained.

Upon drying the emulsion particle treated as above, water contained in the particles evaporates to give the synthetic resin particles having interior pores.

The presence of pores in the interior of the particle can be determined with ease by observation under an optical microscope or an electron microscope.

For example, the dried particles are impregnated with a carbon oil having a refractive index of 1.48 and observed under the optical microscope. When interior pores are present, the observed pores have a black contour due to the difference of refractive indexes between the air in the interior of the particles and the carbon oil.

On the other hand, in the case of a solid particle without pores in the interior, the black contour which identifies the presence of pores is absent because the resin and carbon oil have almost the same refractive index.

The pores in the interior of the particle can be further examined by observing the particle itself or a section of the particle under an electron microscope.

The emulsion particles obtained in the invention have a particle sizes in the range of 0.1 to 5.0$\mu$, preferably 0.3 to 4.0$\mu$.

When the particle size is less than 0.1$\mu$, the hiding power and brightness in particular of the particles is considerably low even though pores are present in the interior of the particle, and hence the particles cannot be used as an organic pigment. On the other hand, particles having a size exceeding 5$\mu$ cannot be readily prepared.

The present invention will hereinafter be illustrated further in detail by way of examples and comparative examples. However, the invention is not intended to be limited to the specific embodiments.

Part and % in the examples are part by weight and % by weight.

EXAMPLE 1

A separable flask equipped with a stirrer, thermometer and a reflux condenser was charged with 550 parts of water and warmed to 70° C. with stirring in a nitrogen atmosphere.

Maintaining the internal temperature at 70° C., 3.5 parts of sodium persulfate was added and dissolved as a polymerization initiator.

Separately, to a mixture of 50 parts of water and 0.3 part of sodium dodecylsulfate, 40 parts of methyl acrylate, 18 parts of butyl acrylate, 40 parts of methyl methacrylate, 2 parts of methacrylic acid and 0.5 part of divinylbenzene were added with stirring to prepare an emulsion. The emulsion thus obtained was reacted by continuously adding over an hour to the above solution in the flask. After finishing the addition, the reaction mixture was aged for an hour to obtain polymer (A). The monomer composition in preparing polymer (A) is composed of 40 parts of acrylate ester monomer ($a_1$) and 60 parts of vinyl monomer ($a_2$).

Another emulsion of monomer (b) was previously prepared by dissolving 6 parts of sodium dodecylsulfate in 300 parts of water and mixing with 564 parts of styrene, 30 parts of methacrylic acid and 6 parts of acrylamide. The emulsion thus obtained was continuously added over 4 hours to polymer (A) particles and reacted during addition. After finishing the addition, the reaction mixture was further aged for 2 hours to obtain emulsion particle having a core-shell structure. The ratio of polymer (A) to polymer (B) in the particle composition was 14.3:85.7.

After finishing the polymerization, 9 parts of 20% aqueous sodium hydroxide solution was added to the emulsion thus obtained. The pH of the emulsion was thus increased to 11.0.

The mixture was heated to 90° C. and stirred for 20 hours at the temperature. The emulsion thus obtained had a non-volatile content of 43%, and a particle size of $0.5\mu$. The particles obtained by drying the emulsion were identified to have pores in the interior of the particles by observation under an electron microscope.

EXAMPLES 2-7

Polymerization was carried out by the same procedures as described in Example 1 except that the composition of each monomer in polymer (A) and polymer (B), weight ratio of polymer (A) to polymer (B) and other factors were changed as illustrated in Table 1. In all cases, emulsion polymers having pores were obtained as in Example 1.

COMPARATIVE EXAMPLE 1

A polymerization and hydrolysis treatment were carried out by the same procedures as described in Example 1 except that methyl acrylate in polymer (A) is replaced by butyl acrylate.

The emulsion thus obtained had a nonvolatile content of 43%. The particle was a solid sphere having an average particle size of $0.4\mu$ and different from that obtained in Example 1, which had pores in the interior.

COMPARATIVE EXAMPLES 2 and 3

In Comparative Example 2, emulsion was prepared under the conditions that formulation and each composition of polymer (A) and polymer (B) were the same as described in Example 2 and the amount of polymer (B) in the particle was changed to 99 parts by weight.

In Comparative Example 3, emulsion was prepared by using the same formulations as described in Example 4 except that methacrylic acid was omitted from polymer (A) and polymer (B). Results are illustrated in Table 1.

COMPARATIVE EXAMPLE 4

An emulsion was prepared by using the same formulations as described in Example 1 except that formulation of polymer (A) was 40 parts of methyl methacrylate, 15 parts of butyl acrylate, 40 parts of methacrylic acid, and 5 parts of 2-hydroxyethyl methacrylate. Results are illustrated in table 1.

The presence of particles having pores was observed. However, more than half were a solid particles without pores. Particle size distribution was broad and a particle size of 0.3 to $0.6\mu$ was observed.

TABLE 1

| Raw material (parts by wt.) | Example | | | | | Comparative Example | | | |
|---|---|---|---|---|---|---|---|---|---|
| | 1 | 2 | 3 | 4 | 5 | 1 | 2 | 3 | 4 |
| First step reaction (Polymer A) | | | | | | | | | |
| MA | 40 | 36 | 20 | | 30 | | 2.1 | | |
| EA | | | | 90 | | | | 90 | |
| BA | 18 | 74.4 | 15 | | 61 | 58 | 4.34 | | 15 |
| MMA | 40 | | 14 | 102 | | 40 | 0.35 | 110 | 40 |
| MAc | 2 | 3.6 | 1 | 8 | 4 | 2 | 0.21 | | 40 |
| HEMA | | 6 | | | 5 | | | | |
| DVB | 0.5 | | | | 0.5 | 0.5 | | | |
| NaLS | 0.3 | 0.12 | 0.2 | 0.6 | 0.2 | 0.3 | 0.007 | 0.6 | |
| ($a_1$)/($a_2$) | 40/60 | 30/70 | 40/60 | 45/55 | 30/70 | 0/100 | 30/70 | 45/55 | 0/100 |
| Second step reaction (Polymer B) | | | | | | | | | |
| St | 564 | | 481 | 70 | 100 | 564 | 686 | 70 | 564 |
| MMA | | 574 | | 400 | 488 | | | 5 | |
| BMA | | | 130 | | | | | | |
| MAc | 30 | 5.8 | 26 | 25 | | 30 | 6.9 | | 30 |
| AAc | | | | | 6 | | | | |
| AAm | 6 | | 13 | 5 | 6 | 6 | | 5 | 6 |
| DVB | | | 2 | | | | | | |

TABLE 1-continued

| Raw material | Example | | | | | Comparative Example | | | |
|---|---|---|---|---|---|---|---|---|---|
| (parts by wt.) | 1 | 2 | 3 | 4 | 5 | 1 | 2 | 3 | 4 |
| NaLS | 6 | 2 | 6.5 | 6 | 3 | 6 | 7 | 6 | 6 |
| (A)/(B) | 14.3/85.7 | 17.1/82.9 | 7.1/92.9 | 28.6/71.4 | 14.3/85.7 | 14.3/85.7 | 1.0/99.0 | 28.6/71.4 | 14.3/85.7 |
| Hydrolysis treatment | | | | | | | | | |
| 20% NaOH | 9 | | | 8 | | 9 | | 8 | |
| 28% NH$_4$OH | | 17 | 25 | | 24 | | 17 | | |
| EtOH | | | | 70 | 35 | | | 70 | |
| pH | 11.0 | 10.0 | 10.3 | 10.0 | 10.2 | 11.0 | 10.0 | 10.2 | 10.9 |
| Temperature (°C.) | 90 | 90 | 93 | 90 | 90 | 90 | 90 | 90 | 90 |
| Time (hr) | 20 | 24 | 24 | 30 | 24 | 20 | 24 | 30 | 20 |
| Non-volatile (%) | 43 | 42 | 42 | 42 | 43 | 43 | 43 | 42 | 43 |
| Particle size (μ) | 0.5 | 0.7 | 0.6 | 0.4 | 0.6 | 0.4 | 0.6 | 0.4 | 0.3–0.6 |
| Pore | found | found | found | found | found | no | no | no | * |

(Note)
MA: Methyl acrylate
EA: Ethyl acrylate
BA: Butyl acrylate
MAA: Methyl methacrylate
St: Styrene
BMA: Butyl methacrylate
MAc: Methacrylic acid
AAc: Acrylic acid
AAm: Acrylamide
HEMA: 2-Hydroxyethyl methacrylate
DVB: Divinylbenzene
NaLS: Sodium dodecylsulfate
EtOH: Ethyl alcohol
*More than half of the particle is solid and no pore is found.

APPLICATION EXAMPLE 1

Application to paints:

Particles of Examples 1 to 5 which had pores in the interior and those of Comparative Examples 1 to 3 which were solid particles were used for organic pigments in place of a part of rutile type titanium dioxide to formulate paints.

As a paint vehicle, an acrylic emulsion having a resin content of 45%, Trade Mark; Almatex E-208, was used. The formulation used for preparing these paints is illustrated in Table 2.

Paints were prepared by charging water, Tamol 731, ethylene glycol, 2-amino-2-methylpropanol, Nopco DF-122-NS and rutile type titanium dioxide into a pigment grinding mill and thoroughly dispersing these ingredients. Successively, one of the emulsion obtained in Examples and Comparative Examples, Almatex E-208, butyl cellosolve/Texanol and hydroxyethyl cellulos/propylene glycol were added with stirring. Viscosity of the paints was adjusted to 70 to 80 KU by using a Stomer viscometer.

TABLE 2

| | Part |
|---|---|
| Water | 45.0 |
| 25% Aqueous solution of Tamol 731 (Trade mark of a product from Rohm & Haas Co.) | 12.2 |
| Ethylene glycol | 40.0 |
| 2-Amino-2-methylpropanol | 3.0 |
| Nopco DF-122NS (Trade mark of a product from Sun Nopco Co.) | 0.8 |
| Rutile type titanium dioxide | 164.5 |
| 40% Emulsion prepared in Examples or Comparative Examples | 102.8 |
| Almatex E-208 (Trade mark of a product from Mitsui Toatsu Chemicals Inc.) | 676.0 |
| 1/2 Solvent mixture of butyl cellosolve/ Texanol (Trade mark of a product from Eastman Kodak Co.) | 40.0 |
| 1/10 Solvent mixture of hydroxyethyl cellulose/propylene glycol | 12.4 |
| Solid content of paint | 46.9% |
| PWC (% of pigment content in solid) | 40.0% |
| Viscosity of paint | 70–80 KU |

The paints thus prepared were applied to slates so as to give a dry film thickness of about 40μ, and dried at room temperature for a week. Then, their performance was evaluated by the following methods.

Gloss:
Measured at an angle of 60° with a glossmeter manufactured by Suga Testing Machine Co.

Hiding power:
Measured in accordance with JIS K-5663. Using an applicator, a paint to be tested is applied to a sheet of hiding power test paper manufactured by Japan Test Panel Industrial Co. so as to give a dry film thickness of 75μ, and dried at room temperature for a week. Therefore, the hiding power was calculated from the 45°/0° reflectance ratio.

Water resistance:
Absence of disorder such as blister and whitening was judged ◯.

Alkali resistance:
Absence of disorder such as blister and whitening was judged ◯.

Weather resistance:
After irradiating in a weather-o-meter for 500 hours, absence of disorder such as blister, whitening and less in gloss was judged ◯.

Washability:
Measured in accordance with JIS K-5663.
No peel off of painted film after washing more than 2000 times was judged ◯.
No peel off of painted film after washing from 1000 to 2000 times was judged Δ.

Adherence:
No stripping of painted film at a crosscut was judged ◯. Some stripping of painted film at a crosscut was judged Δ.

Results are illustrated in Table 3.

APPLICATION EXAMPLE 2

Application to paper coating:

The performance of emulsions obtained in Examples 1 to 5 and Comparative Examples 1 to 4 were evaluated as organic pigments or fillers for use in paper coating fluid.

The formulation and evaluation procedures were as follows.

|  | Part |
|---|---|
| UW-90 (Trade mark of a product from EMC Co.) | 90 |
| Pigment or filler | 10 |
| Aron T-40 (Trade mark of a product from Toagosei Chemical Ind.) | 0.09 |
| MS-4600 (Trade mark of a product from Nippon Food Industrial Co.) | 3 |
| Polylac 755 (Trade mark of a product from Mitsui Toatsu Chemicals Inc.) | 12 |
| Solid content of coating fluid | 62% |

The coating fluid was prepared by adding dispersant Aron T-40 having a solid content of 40% to water, sufficiently dispersing kaolin clay UW-90 with a Kaules mixer and further mixing with one of the emulsion obtained in Examples 1 to 5 and Comparative Examples 1 to 4 as an organic pigment.

For the purpose of comparison, titanium dioxide paste having a solid content of 62% (a product of Dainichi Seika Co.) was used an inorganic pigment and precipitated calcium carbonate slurry TP-222HS having a solid content of 60% (a product of Okutama Industrial Co.) was used as an inorganic filler. Phosphated starch MS-4600 and Polylac 755 having a solid content of 50% were added as binders to obtain coating fluids.

Using an applicator, each of the above obtained coating fluids was applied to wood free paper so as to give a dry pickup of 14 to 15 g/m$^2$ and then dried at 120° C. for 20 seconds. Thereafter, under such conditions as a roll temperature of 60° C., a linear pressure of 70 kg/cm and a speed of 10 m/min, the applied paper was passed twice through calender rolls to obtain coated paper, and its performance was evaluated by the following methods.

Color viscosity:

Measured with a BM type viscometer at 60 r.p.m. by using a No. 4 rotor.

Gloss of coated paper:

Reflectance at an angle of 75° was measured in accordance with JIS P-8142.

Printed gloss:

Using an RI printing tester, coated paper was printed with 0.4 cc of New Bright Indigo manufactured by Toyo Ink Co. After drying, reflectance at an angle of 75° was measured in accordance with JIS P-8142.

Brightness:

Measured with a Hunter brightness meter in accordance with JIS P-8123.

Opacity:

Measured in accordance with JIS P-8138.

Dry pick:

Tested with an RI printing tester. In the evaluation, ten points were regarded as a full mark.

Wet pick:

Tested with an RI printing tester. In the evaluation, ten points were regarded as a full mark.

Results are illustrated in Table 4.

TABLE 3

| Application Example | Emulsion particle | TiO$_2$/Emulsion particle (w/w) | Gloss | Hiding power (%) | Water resistance | Alkali resistance | Weather resistance | Washability | Adherence |
|---|---|---|---|---|---|---|---|---|---|
| 1-1 | Example 1 | 80/20 | 93 | 95 | o | o | o | o | o |
| 1-2 | Example 2 | 80/20 | 93 | 96 | o | o | o | o | o |
| 1-3 | Example 3 | 80/20 | 92 | 93 | o | o | o | o | o |
| 1-4 | Example 4 | 80/20 | 92 | 92 | o | o | o | o | o |
| 1-5 | Example 5 | 80/20 | 94 | 96 | o | o | o | o | o |
| 1-6 | Comp. Example 1 | 80/20 | 87 | 89 | o | o | o | o | o |
| 1-7 | Comp. Example 2 | 80/20 | 86 | 88 | o | o | o | o | o |
| 1-8 | Comp. Example 3 | 80/20 | 89 | 88 | o | o | o | o | o |
| 1-9 | Comp. Example 4 | 80/20 | 89 | 89 | x | x | o | x | o |

TABLE 4

| Application Example | Pigment or filler | Color viscosity (cps) | Gloss of coated paper | Printed gloss | Brightness | Opacity | Dry pick | Wet pick |
|---|---|---|---|---|---|---|---|---|
| 2-1 | Example 1 | 1750 | 80.0 | 94.0 | 81.3 | 96.3 | 8 | 8 |
| 2-2 | Example 2 | 1650 | 79.9 | 94.3 | 81.1 | 96.5 | 8 | 9 |
| 2-3 | Example 3 | 1720 | 79.5 | 93.7 | 81.1 | 96.1 | 8 | 8 |
| 2-4 | Example 4 | 1780 | 79.5 | 94.0 | 80.6 | 95.6 | 9 | 8 |
| 2-5 | Example 5 | 1710 | 80.0 | 94.3 | 81.3 | 96.6 | 8 | 8 |
| 2-6 | Comp. Example 1 | 1730 | 77.4 | 89.7 | 78.0 | 94.1 | 7 | 7 |
| 2-7 | Comp. Example 2 | 1610 | 77.3 | 89.4 | 77.9 | 93.8 | 8 | 8 |
| 2-8 | Comp. Example 3 | 1780 | 77.7 | 89.8 | 77.8 | 93.9 | 7 | 7 |
| 2-9 | Comp. Example 4 | 1980 | 77.1 | 88.9 | 78.0 | 94.0 | 6 | 6 |
| 2-10 | TiO$_2$ | 1820 | 71.3 | 88.7 | 81.9 | 97.1 | 8 | 9 |

TABLE 4-continued

| Application Example | Pigment or filler | Color viscosity (cps) | Gloss of coated paper | Printed gloss | Brightness | Opacity | Dry pick | Wet pick |
|---|---|---|---|---|---|---|---|---|
| 2-11 | $CaCO_3$ | 1220 | 69.8 | 88.3 | 77.5 | 93.9 | 8 | 9 |

What is claimed is:

1. A synthetic resin emulsion of core-shell solid particles having a diameter of from 0.1 to 5.0μ and a core-shell polymer weight ratio of from 2:98 to 60:40, the shell of which is formed of a hydrophobic polymer and the core of which is formed of a water-swollen, hydrophilic polymer, wherein said particles are produced by the steps of: preparing as core particles from 2 to 60 parts by weight of a polymer (A) by emulsion polymerization of from 10 to 80 parts by weight of an acrylate ester ($a_1$) having an alkyl group of from 1 to 3 carbon atoms and from 90 to 20 parts by weight of at least one other vinyl monomer ($a_2$), which is a copolymerizable monomer of ($a_1$), monomer ($a_2$) having an unsaturated carboxylic acid in an amount from about 0.5 to 4 parts by weight per 100 parts by weight of the sum of monomer ($a_1$) and monomer ($a_2$); forming a polymer (B) as an external layer on the surface of the polymer (A) by emulsion polymerization of from 98 to 40 parts by weight of at least one vinyl monomer other than an ($a_1$); and successively hydrolyzing the core particle portion with an alkaline material of resultant core-shell structure of the emulsion particle whereby pores form spontaneously in the particles upon drying.

2. The synthetic resin emulsion of claim 1 wherein the amount of the acrylate ester ($a_1$) is from about 25 to 50 parts by weight per 100 parts by weight of the sum of the acrylate ester ($a_1$) and the monomer ($a_2$).

3. The synthetic resin emulsion of claim 1 wherein monomer ($a_2$) comprises up to 2 parts by weight of a crosslinking monomer.

4. The synthetic resin emulsion of claim 1 wherein polymer (B) has a glass transition temperature of at least 50° C.

5. A process for the production of a synthetic resin emulsion of claim 1 comprising the steps of preparing from 2 to 60 parts by weight of a polymer (A) by emulsion polymerization of from 10 to 80 parts by weight of an acrylate ester ($a_1$) having an alkyl group of from 1 to 3 carbon atoms and from 90 to 20 parts by weight of at least one other vinyl monomer ($a_2$), which is a copolymerizable with monomer ($a_1$), monomer ($a_2$) having an unsaturated carboxylic acid in an amount from about 0.5 to 4 parts by weight per 100 parts by weight of the sum of monomer ($a_1$) and monomer ($a_2$), to produce an emulsion of the core particles forming a polymer (B) as an external layer on the surface of the polymer (A) by emulsion polymerization in the emulsion of the core particle of from 98 to 40 parts by weight of at least one vinyl monomer (b) other than monomer and successively hydrolyzing the core particle portion with an alkaline material resultant core-shell structure of the emulsion particle.

6. The process of claim 5 wherein the amount of the acrylate ester ($a_1$) is in the range of from 25 to 50 parts by weight per 100 parts by weight of the sum of the acrylate ester ($a_1$) and the other vinyl monomer ($a_2$).

7. The process of claim 5 wherein the core particle portion is hydrolyzed at a pH from 8 to 13.

8. The process of claim 5 wherein the core particle portion is hydrolyzed at temperature from 50° to 100° C.

9. The process of claim 5 wherein the vinyl monomer ($a_2$) is a single monomer or a combination of two or more monomers selected from the group consisting of an alkyl (meth)acrylate having 4 or more carbon atoms, in the alkyl group, an aromatic vinyl compound, a vinyl cyano compound and a halogenated vinyl compound.

10. The process of claim 5 wherein monomer (b) is one or more monomers of selected from the group consisting of an aromatic vinyl compound, a (meth)acrylate ester, a vinyl cyano compound and a halogenated vinyl compound.

11. The process of claim 7 wherein the unsaturated carboxylic acid is one or more monomers selected from the group consisting of (meth)acrylic acid, crotonic acid and itaconic acid.

12. The process of claim 5 wherein monomer ($a_1$) is methyl acrylate.

13. A paint comprising a synthetic resin emulsion of claim 1.

14. A paint comprising a synthetic resin emulsion of claim 2.

15. A pigmented paper coating composition comprising as at least a portion of the pigment a synthetic resin emulsion of claim 1.

16. A pigmented paper coating composition comprising as at least a portion of the pigment a synthetic resin emulsion of claim 2.

* * * * *